324-77.

SR

XR 3,577,089

[11] 3,577,089

[72] Inventor Etienne Gorog
White Plains, N.Y.
[21] Appl. No. 520,798
[22] Filed Jan. 14, 1966
[45] Patented May 4, 1971
[73] Assignee International Business Machines Corporation
Armonk, N.Y.
[32] Priority Feb. 26, 1965
[33] France
[31] 7545

[54] DATA TRANSMISSION TIME DOMAIN EQUALIZER

3 Claims, 4 Drawing Figs.

[52] U.S. Cl. .......... 328/165, 328/167, 333/28, 324/77
[51] Int. Cl. .......... H03k 5/00
[50] Field of Search .......... 328/162, 110, 111, 115; 333/28; 324/77

[56] References Cited

UNITED STATES PATENTS

| | | | |
|---|---|---|---|
| 2,760,164 | 1956 | Graham | 333/28 |
| 3,100,874 | 1963 | Soland | 328/165 |
| 3,114,884 | 1963 | Jakowatz | 328/165 |
| 3,214,700 | 1965 | Hook | 328/115 |
| 3,305,798 | 2/1967 | Rappeport | 333/28 |
| 3,344,353 | 9/1967 | Wilcox | 328/151 |
| 3,366,895 | 1/1968 | Lucky | 333/28 |

*Primary Examiner*—Donald D. Forrer
*Assistant Examiner*—Harold A. Dixon
*Attorneys*—Hanifin and Jancin and John W. Girvin, Jr.

ABSTRACT: Apparatus for equalizing digital data which has been distorted in transmission. The value of the signal at each instant of time is delayed and modified by a weighting junction and added to the value of the signal input at the next instant of time in an analog adder. The output of the analog adder is applied to a series of cascaded digital correction devices, the outputs of which are each connected through weighting junctions and switches to the analog adder to control the equalization of the signal input. The equalized signal output is taken from the last of these cascaded correction devices.

INVENTOR

ETIENNE GOROG

BY John W Girvin, Jr

ATTORNEY

DATA TRANSMISSION TIME DOMAIN EQUALIZER

This invention relates to digital signal reception, and more particularly to a means for equalizing distorted digital signals at the receiver.

In pulse transmission systems, pulse distortion brought about by transmitting the pulse through the transmission media is a troublesome problem. Various devices have been utilized to correct the signal distortion and are referred to as equalizer devices, the correction to the distorted signal being referred to as equalization.

Linear devices for time domain equalization are known in the prior art. In such devices, the incoming waveform is supplied to a delay system and signals are tapped from a number of points disposed along the delay system. These signals are appropriately weighted and then combined in a predetermined manner to provide a suitable equalized output signal. An equalization procedure consists of adjusting the weights given each tapped signal in the equalizer. In conventional procedures, one desires to choose each weight so that the values of the equalized signal element response at the sampling instants following and preceding a given bit are zero, thereby cancelling all wave shape perturbations at all sampling instants except that at which the signal is detected. One general way to proceed is to solve directly the linear system of $q+r$ equations with $q+r$ unknowns where $q$ is equal to the number of weighted taps for cancelling the perturbations preceding the signal and $r$ is equal to the number of weighted taps for cancelling the perturbations following the signal. Measurements of the equalized signal will, then, indicate whether the distortion has been corrected or not, and in the case where it has been corrected, whether it has been sufficiently corrected or not. This solution is not very practical since it requires that either an analog or a digital computer be attached to the equalizer for determining when the equalizer is in optimum adjustment. This is particularly true when the adjustment of one weighted junction interacts with the response of another.

Further, these prior art devices utilize the principal peak for correcting the perturbations at other sampling times thereby necessitating feedback loops in order to equalize perturbations preceding the principal peak. A second way to proceed is to choose a value $\alpha$, to adjust each weighted tap $x_\alpha$ so as to cancel the signal at sampling instant $i=\alpha$, and with an iterative process, to try converging the solution of the linear system. However, a large number of iterations may be required, and this number cannot be easily predicted (if it can be predicted at all) with conventional equalizers.

Accordingly, it is an object of this invention to provide an equalizer which has the advantage of a simple procedure with no iterative process.

A further object is to provide an equalizer which can be used without an analog or digital computer being attached thereto.

A further object is to equalize a signal by using the first nonnegligible perturbation for correcting a perturbation at another sampling time.

In accordance with one aspect of the invention, correction is effected on both the trailing edge pulses and prepulses preceding and following respectively the information bit. Generally, for a signal preceded by $m$ disturbances and followed by $n$ disturbances, $m-1$ elements are provided which correct the $m$ preceding disturbances except for the first one, and $m+n-1$ elements are provided for correcting all disturbances which follow after the previous operation.

The foregoing and other objects, features and advantages of the invention will be apparent from the following more particular description of a preferred embodiment of the invention, as illustrated in the accompanying drawings.

Figures 1, 2:
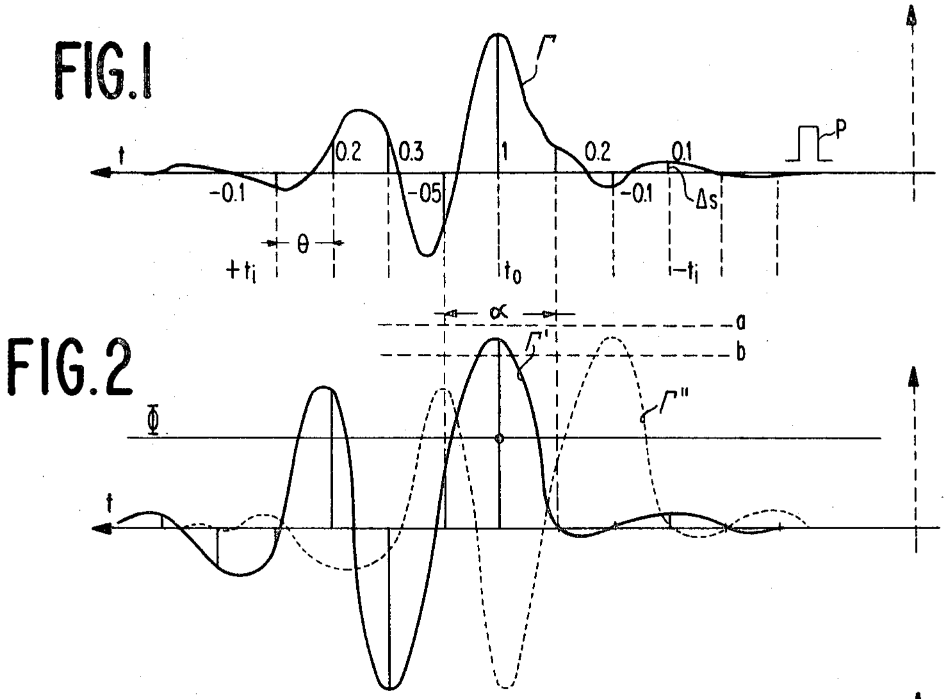
FIG. 1 is an example of a waveform of a transmission network response to a pulse.
FIG. 2 shows a partially reshaped waveform response.

Referring now to FIG. 1, a signal waveform Γ is shown which is representative of the transmission media's response to a pulse P. Assuming that the transmitted data bits and hence sampling times are spaced apart by a time interval Θ, it is seen that the signal response Γ is spread over several sampling times from $-t_i$ to $+t_i$. The level of Γ being nonzero or being greater than a minimum threshold level at each of these sampling times, it follows that the receiver would detect several pulses for one pulse sent through, one for each sampling time included into the duration of Γ. It is, therefore, necessary to correct the signal Γ so that the signal has only one main peak at one sampling time.

The signal Γ may be expressed by the polynomial:

$$\Omega(x)=\sum_{i=-m}^{i=+n} S_i x^i$$

$$n>0,\ m>0$$

$S_i$ being the different values of the response signal element at various sampling times.

As far as the illustrative example shown by the wave shape Γ is concerned, three nonnegligible disturbances are found before the main peak and four after the main peak; hence, $m=3$, $n=4$.

Therefore, for the wave shape Γ shown in FIG. 1, the polynomial becomes:

$$\Omega(x)=\underbrace{-0.1x^4+0.2x^3+0.3x^2-0.5x+0.2x^{-1}}_{\text{disturbances following the main peak}}\ \underbrace{+1}_{\text{main peak}}\ \underbrace{+0.2x^{-1}-0.1x^{-2}+0.1x^{-3}}_{\text{disturbances preceding the main peak}}$$

Figure 4:
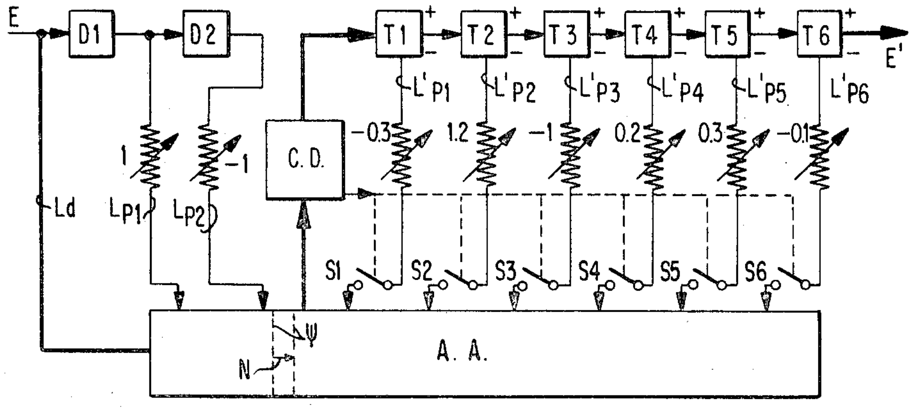
FIG. 4 is a block diagram of one embodiment of the invention.

Referring now to FIG. 4, an equalizer device is shown. For the example given wherein the wave shape Γ has three prepulses ($m=3$) and four trailing pulses ($n=4$) there are provided $m-1=2$ correction analog devices D1 and D2 which are both time delay elements delaying the signal by Θ; and $m+n-1=6$ digital correction devices, T1—T6. The input signal Γ appearing at E is directly coupled to analog adder A.A. and to the input of time delay element D1. The output of delay element D1 is connected to the input of time delay element D2. The output of each of the time delay elements is connected through weighted junctions $L_{P1}$ and $L_{P2}$ to analog adder A.A. An output of the analog adder A.A. (shown symbolically at N) is connected to a control and compare circuit C.D. The output of the control and compare circuit C.D. is connected to digital correction device T1. Each of the digital correction devices T1—T6 are connected in tandem to one another and are connected through weighted junctions $L'_{P1}$—$L'_{P6}$ and switches S1—S6 to analog adder A.A. The output signal of the equalizer is taken from the output of digital correction device T6 at E'.

In operation, the signal enters the equalizer at point E. Assuming that the transmission media has previously been at rest, that is no signal had been propagated through it, the disturbance $\Delta s$ shown graphically in FIG. 1 at sampling instant $-t_i$ is conveyed to analog adder A.A. through line $Ld$. The disturbance $\Delta s$ is also delivered to analog delay element D1 having a delay interval Θ. At the next sampling time, the input signal is combined with a correction value obtained from delay element D1 through weighted junction $L_{P1}$ in terms of the value of the signal the instant before. The output of the delay element D1 is also stored in delay element D2 while the value of the signal at the second sampling instant is stored in delay element D1. At the next sampling instant and thereafter, the correction value delivered by D1 and D2 through the weighted junction $L_{P1}$ and $L_{P2}$ to the analog adder are combined with the input signal and the signal stored by delay element D1 is transferred to D2 as above. Thus, the first part of the equalizer operates as the right half of a conventional time-domain equalizer, where $m-1$ (2 in the present example) steps are used in the equalization procedure. The adjustment procedure for adjusting each weighted junction is, however, essentially different from conventional procedures. Generally, the $j$th step consists in adjusting weighted junction $L_{Pj}$ so as to cancel the signal at $$i=-(m-j).$$

Thus $$L_{Pj}=\frac{-S_{-m+j}^{(j-1)}}{S_{-m}^{(j-1)}}$$

where $S_I^J$ equals the value of sample I of the signal element response after the Jth equalization iteration, and where $$S_{-m+j}^{(j-1)}=S_{-m+j}+L_{P1}S_{-m+j-1}+\ldots+L_{P(j-1)}S_{-m+1}$$

Unlike conventional equalizers, $L_{Pj}$ may be greater than 1. The result is the following:

$$S_{-m}^{(j)}=S_{-m} \text{ for } 1\leq j\leq m-1$$

$$S_{-m+k}^{(j)}=0 \text{ for } 1\leq j\leq m-1$$

$$1\leq k\leq j$$

After $(m-1)$ steps the form of the signal-element response is such that:

$$\Omega^{(m-1)}(x)=\sum_{i=0}^{i=n+m-1} S_i^{(m-1)}x^i+S_{-m}x^{-m}$$

At this point, we have eliminated almost all signal distortion elements preceding the information sample. Equalization of signal distortion preceding the information is not perfect since $S_{1m}$ cannot be cancelled.

For the example given where $m=3$, the assumed signal Γ shown graphically in FIG. 1 becomes signal Γ′ shown in FIG. 2 after it has been acted upon by elements D1, D2, and analog adder A.A. (symbolically shown at N). It should be noted that the trailing pulses are modified in nature and number with respect to that of response Γ. They spread notably over a time interval composed of six times interval Θ and have different coefficients than that of response Γ. Waveform Γ′ is given mathematically by $\Omega''(x)$ taken from $\Omega(x)$ of Γ:

$$\Omega''(x)=\Omega'(x)-x^2\cdot\Omega(x) \text{ wherein } \Omega'(x)=\Omega(x)-x\cdot\Omega(x)$$

$$\Omega''(x)=0.1x^6-0.3x^5-0.2x^4+x^3-1.2x^2+0.3x+1.3+0x^{-1}+0x^{-2}+0.1x^{-3}$$

It is noted that the signal is cancelled at $x^{11}$ and $x^{12}$ thereby eliminating all signal distortion elements preceding the main peak except that at $x^{13}$. This expression applied here in the case of the example, but which is perfectly general, confirms that the trailing pulses following the main peak α of Γ′ spread over a time interval equal to 6Θ and have coefficients as determined by the expression. Up until this point, we have assumed that the pulse P was the first pulse to appear on the transmission network. However, if we assumed that the pulse P yielding the wave shape Γ′ after it has passed through analog adder A.A. at N has been preceded on the transmission network by one or more pulses, for example by a pulse sent two sampling times Θ earlier which yielded wave shape Γ″ shown in FIG. 2 it will be seen that Γ″ is identical to Γ′, but out of phase with Γ′. In order to detect the main pulse Γ′ at time interval α it is necessary to know the value of the pulse Γ″ at that instant. Similarly, it is necessary to know the values of all pulses preceding the pulse to be detected which effect a disturbance at sampling time α. Thus, each pulse needs to be stored and kept in storage during a time equal to $(m+n-1)$ Θ, it further being necessary to determine its disturbance value that it will keep on bringing about successively at each of the corresponding $m+n-1$ sampling times. Referring once again to FIG. 4, the digital storage elements T1—T6 in conjunction with their weighted junctions through lines $L'_{P1}$—$L'_{P6}$ achieve the above results and are used in the given embodiment. However, it recognized that these digital storing elements may be replaced by analog elements.

Since digital storing elements T1—T6 are utilized, it is necessary to consider the transmission mode of the incoming signal since the circuits involved up to now have been analog and will answer to any arbitrary state of the signal. Considering a general case where binary data in the form of 1's and 0's is sent through the transmission media, if a positive going pulse is sent for a binary 1 while a negative pulse is sent for a binary 0 there will always be a pulse on the line during a message. These pulses will be symmetrical with respect to the line rest state. Since there will always be a pulse at each sampling time of either positive or negative polarity, the device will register and store the polarity of each pulse and also take into account the line rest state before and after each message. Referring now to FIG. 4, the digital storing elements T1—T6 may be binary triggers. Since these binary triggers can only represent an active state of the line, their influence before a message on the rest state of a line is eliminated by disconnecting them from the analog adder A.A. by opening switches S1—S6.

The incoming waveform Γ′ from point N of analog adder A.A. is presented to control device C.D. The control device C.D. has a threshold detector therein and is only operative upon the incidence of a signal having an amplitude greater than that of level Φ. This level Φ is shown graphically in FIG. 2. Thus, at the beginning of a message, the threshold detector of the control device C.D. detects the presence of the main peak α of the response Γ′ as the first pulse of the message. Upon the detection of the main peak α, control device C.D. controls the setting of digital correction device T1 to be either positive or negative according to the pulse polarity of main peak α and also controls the closure of switch S1 one sampling instant later. At the next sampling instant, S1 being closed, the modified amplitude of the pulse stored in T1 is added in analog adder A.A. with signal Γ′. Thus, the signal amplitude at the first sampling time after the main peak α is equalized. At this time, the state of T1 is transferred to T2 and T1 is set according to the polarity of the pulse at that sampling instant. At each sampling instant thereafter, the state of each of the cascaded digital correction devices is transferred to the next digital correction device and T1 is set according to the polarity of the pulse at that sampling instant. Switches S1—S6 close in succession, a different one closing at each sampling instant until all are closed. Once the switches are closed, they stay closed until the message is ended. Weighted links $L'_{P1}$—$L'_{P6}$ are such that one obtains the corresponding corrections whose amplitudes are given from the coefficients of $\Omega''(x)$. These weighted junctions are proportional to −0.1 +0.3, +0.2, −1, +1.2, −0.3 for cancelling waveform perturbations from sampling instant $m+n-1$ to $\alpha+1$ respectively.

Figure 3:
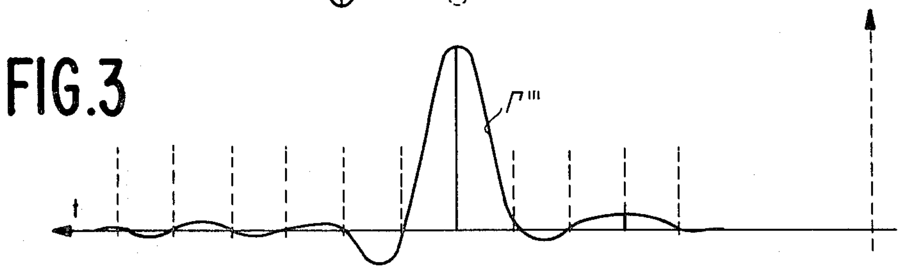
FIG. 3 shows a corrected waveform response.

The incoming signal through the control device C.D. is shown by wave shape Γ″ in FIG. 2. The message comes out through point E′ of FIG. 4 in reshaped pulse form as shown by wave shape Γ‴ of FIG. 3. Once the message is ended, the signal no longer crosses threshold Φ and control device C.D. controls the opening of switches S1—S6. This feature enables one to utilize the control device C.D. to detect an error through the lack of a pulse during each such period. The determination of the threshold Φ must be done taking into account possible level variations of the input signal.

In the case of a more simple transmission wherein the binary data value 1 is represented by a pulse and the binary data value 0 is represented by the absence of a pulse, the device remains the same, with permanent junctions being substituted for switches S1—S6. It should be noted that if wave shape Γ′ shows a disturbance greater than the threshold value Φ before its main peak α, it is possible within a shift in time to detect a presence of a pulse by its first or subsequent crossing of the threshold value and consequently to establish correction. Thus, if there are a plurality of threshold crossings, the control device C.D. may be controlled so as to accept only certain crossings.

While the invention has been particularly shown and described with reference to a preferred embodiment thereof, it will be understood by those skilled in the art that various changes in form and detail may be made therein without departing from the spirit and scope of the invention.

I claim:

1. A time domain equalizer for equalizing an input signal from a transmission line at sampling times preceding and following the main signal, where the input signal is composed of a main signal pulse to be detected, $m$ prepulses preceding the main signal pulse, and $n$ trailing pulses following the main signal pulse, comprising:

a succession of $m-1$ correction elements connected in cascade, the first of said correction elements being connected to said transmission line;

a first series of $m-1$ weighted junctions each having its input connected to the output of a different correction element, and each supplying a weighted output signal;

analog adding means having an input connected to said transmission line and having additional inputs connected to each of the outputs of said weighted junctions for adding said input signal to each of said weighted output signals so that all but the first prepulses preceding the main signal appearing at the output of said analog adder are equalized;

a control device for detecting the main signal pulse connected to the output of said analog adder;

a succession of $m+n-1$ storage elements connected in cascade, the input of the first of said storage elements being connected to the output of said control device, and the output of the last of said storage elements constituting the equalizer output;

a second series of $m+n-1$ weighted junctions each connected to the output of a different storage element and each connected to further additional inputs of said analog adding means so that all the trailing pulses following the main signal pulse appearing at the output of said analog adder are equalized.

2. The time domain equalizer of claim 1 wherein each of said $m-1$ correction elements consist of an analog delay element for delaying the input signal one sampling time.

3. The time domain equalizer of claim 2 wherein each of said $m+n-1$ storage elements consists of digital storage devices and wherein said control device effects the movement of digital data stored in each storage element from one storage element to another only at sampling times.